US012123377B2

(12) United States Patent
Grunwald et al.

(10) Patent No.: US 12,123,377 B2
(45) Date of Patent: Oct. 22, 2024

(54) METHOD FOR OPERATING A FUEL TANK ARRANGEMENT FOR A MOTOR VEHICLE, AND CORRESPONDING FUEL TANK ARRANGEMENT

(71) Applicants: AUDI AG, Ingolstadt (DE); VOLKSWAGEN AKTIENGESELLSCHAFT, Wolfsburg (DE)

(72) Inventors: Oliver Grunwald, Buxheim (DE); Aleksandar Tesic, Wolfsburg (DE)

(73) Assignees: AUDI AG, Ingolstadt (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 18/253,085

(22) PCT Filed: Dec. 7, 2021

(86) PCT No.: PCT/EP2021/084670
§ 371 (c)(1),
(2) Date: May 16, 2023

(87) PCT Pub. No.: WO2022/122771
PCT Pub. Date: Jun. 16, 2022

(65) Prior Publication Data

US 2023/0417205 A1 Dec. 28, 2023

(30) Foreign Application Priority Data

Dec. 9, 2020 (DE) ......................... 102020215552.6

(51) Int. Cl.
*F02M 25/08* (2006.01)

(52) U.S. Cl.
CPC .... *F02M 25/0836* (2013.01); *F02M 25/0809* (2013.01); *F02M 25/0854* (2013.01)

(58) Field of Classification Search
CPC ........... F02M 25/0836; F02M 25/0809; F02M 25/0854; F02M 25/0818; F02M 25/089; B60K 15/03504; B60K 2015/0348
See application file for complete search history.

(56) References Cited

U.S. PATENT DOCUMENTS 6,321,727 B1 * 11/2001 Reddy ................ F02M 25/0809 123/520
6,374,663 B1 * 4/2002 Muller .................. G01M 3/025 702/50

(Continued)

FOREIGN PATENT DOCUMENTS

DE 19829423 A1 1/2000
DE 102012007214 A1 10/2012

(Continued)

OTHER PUBLICATIONS

International Preliminary Report on Patentability issued on Jun. 13, 2023, in corresponding International Application No. PCT/EP2021/084670, 12 pages.

(Continued)

*Primary Examiner* — Syed O Hasan
(74) *Attorney, Agent, or Firm* — Maier & Maier, PLLC

(57) ABSTRACT

A method for operating a fuel tank arrangement for a motor vehicle. The fuel tank arrangement has a fuel tank, a hydrocarbon filter and a pump. The fuel tank is fluidically connected via a tank shut-off valve to the hydrocarbon filter and the hydrocarbon filter is fluidically connected, on the one hand, via the pump to an external environment of the fuel tank arrangement and, on the other hand, via a purge valve to an intake tract of an internal combustion engine. A first leakage test mode is carried out when the pressure in the (Continued)

fuel tank is greater than a pressure threshold value, in which a shut-off valve arranged in terms of flow between the pump and the external environment is closed and the tank shut-off valve is opened.

20 Claims, 2 Drawing Sheets

(56) References Cited

U.S. PATENT DOCUMENTS

| | | | | |
|---|---|---|---|---|
| 2004/0261506 | A1* | 12/2004 | Amlin | G01M 3/025 73/49.7 |
| 2014/0257721 | A1* | 9/2014 | Thompson | G07C 5/00 73/49.3 |
| 2018/0171938 | A1 | 6/2018 | Watanabe et al. | |
| 2020/0132023 | A1 | 4/2020 | Ishihara et al. | |
| 2020/0224610 | A1 | 7/2020 | Huh | |
| 2021/0040919 | A1* | 2/2021 | Collet | B60K 15/03504 |

FOREIGN PATENT DOCUMENTS

| | | | | |
|---|---|---|---|---|
| DE | 102013109459 | A1 * | 4/2014 | F02M 25/0818 |
| DE | 102015221536 | A1 | 5/2017 | |
| JP | 2013085528 | A * | 5/2013 | |
| JP | 2013185528 | A * | 9/2013 | F02M 25/0818 |
| WO | 2019170973 | A1 | 9/2019 | |

OTHER PUBLICATIONS

International Search Report and Written Opinion issued on May 10, 2022 in corresponding International Application No. PCT/EP2021/084670; 13 pages.

* cited by examiner

METHOD FOR OPERATING A FUEL TANK ARRANGEMENT FOR A MOTOR VEHICLE, AND CORRESPONDING FUEL TANK ARRANGEMENT

FIELD

The invention relates to a method for operating a fuel tank arrangement for a motor vehicle, the fuel tank arrangement having a fuel tank, a hydrocarbon filter and a pump, wherein the fuel tank is fluidically connected to the hydrocarbon filter via a tank shut-off valve and the hydrocarbon filter is fluidically connected, on the one hand, via the pump to an external environment of the fuel tank arrangement and, on the other hand, via a purge valve to an intake tract of an internal combustion engine. The invention further relates to a fuel tank arrangement for a motor vehicle.

BACKGROUND

For example, DE 10 2015 221 536 A1 is known from the prior art. This describes a device for diagnosing a tank leakage of a fuel tank in a motor vehicle, wherein the fuel tank is connected to the intake tract of an internal combustion engine via a vent line, wherein the internal combustion engine can be charged by means of a pressure generator, wherein the fuel tank can be pressurised with compressed air by means of a pressure generated in the pressure generator, wherein a valve is arranged in the vent line, via which valve the fuel tank can be pressurised with compressed air, wherein the valve can be closed after pressurisation in such a way that the vent line is blocked, and wherein a pressure sensor for diagnosing the tank leakage is arranged in the vent line or in the fuel tank.

Furthermore, DE 10 2012 007 214 A1 describes a device for leak testing a fuel system for a motor vehicle with a first accumulator and a second accumulator each with a storage medium for irreversibly binding volatile fuel components, the first accumulator and the second accumulator being connected to a fuel tank via at least one tank vent line and to an intake tract of an internal combustion engine of the motor vehicle via at least one intake line. In this case, the second accumulator has a smaller storage volume than the first accumulator and, during the leak test, can be acted upon by a flow of the volatile fuel constituents guided through the tank ventilation line and the intake line from the fuel tank to the internal combustion engine, a throttle element being arranged upstream of the second accumulator in the direction of flow in order to reduce a cross-sectional area of flow.

SUMMARY

It is the objective of the invention to propose a method for operating a fuel tank arrangement for a motor vehicle which has advantages over known methods, in particular serves to carry out a leak test of the fuel tank arrangement more reliably with lower energy requirements.

According to the invention, this is achieved by a method for operating a fuel tank arrangement for a motor vehicle. It is provided that a first leakage test mode is carried out when a pressure in the fuel tank is greater than a pressure threshold value, in which a shut-off valve arranged in terms of flow between the pump and the external environment is closed and the tank shut-off valve is opened and then, during a test period, the pressure in the fuel tank is measured by means of a pressure sensor arranged in the fuel tank and, if a differential threshold value is exceeded, a leakage of the fuel tank arrangement is detected by a pressure difference of a pressure drop of the pressure over a specific period of time.

The fuel tank arrangement is preferably part of the motor vehicle, but can of course also be separate from it. The fuel tank arrangement comprises as essential components at least the fuel tank, the hydrocarbon filter and the pump. In addition, the tank shut-off valve and the purge valve are provided. The fuel tank is used for the intermediate storage of a fuel which is used at least temporarily for operating a drive device of the motor vehicle. The drive device serves to drive the motor vehicle, that is to provide a drive torque directed towards driving the motor vehicle. The drive torque is generated by the drive device with the aid of the drive unit, to which fuel taken from the fuel tank is supplied for this purpose.

The fuel tank is designed as a so-called pressure tank. This means that it is normally closed, namely with the aid of the tank shut-off valve, which is arranged fluidically between the fuel tank and the hydrocarbon filter. Depending on the ambient conditions of the fuel tank arrangement, an overpressure can occur in the fuel tank, which is caused by fuel that has passed into the gas phase, in particular by evaporation and/or vaporisation. By overpressure it is to be understood that a pressure is present in the fuel tank which is greater than a pressure present in the external environment of the fuel tank arrangement. In the context of this description, when referring to the pressure present in the fuel tank, this can be understood as an absolute pressure. Preferably, however, the pressure is present as a relative pressure with respect to a reference pressure, whereby the pressure in the external environment is preferably used as the reference pressure.

A fuel filler pipe is fluidically connected to the fuel tank, which comprises a tank opening on its side facing away from the fuel tank, which can be closed by means of a tank cap. Fuel can be supplied to the fuel tank via the fuel filler pipe, for example from a tap or the like. To do this, the tank opening must be released and the tank cap must be opened or moved in relation to the tank opening. The fuel can then be introduced through the tank opening into the fuel filler pipe and through this into the fuel tank. If the overpressure is present in the fuel tank when the tank cap is opened, it is abruptly released when the tank cap is opened through the tank opening in the direction of the external environment.

To avoid this in particular, the fuel tank is therefore preferably vented from time to time, in particular before the tank cap is opened. For this purpose, the tank shut-off valve is opened so that fluid present in the fuel tank, which consists in particular of air and gaseous fuel or hydrocarbon, can flow in the direction of the external environment of the fuel tank arrangement. The fluid flowing in the direction of the external environment flows through the hydrocarbon filter. This filters out the fuel or hydrocarbon present in the fluid so that it cannot escape into the external environment. The hydrocarbon filter preferably comprises a filter body made of activated carbon and/or consists at least partially of activated carbon. The fuel or hydrocarbon filtered out of the fluid is temporarily stored in the hydrocarbon filter. The fuel or hydrocarbon enters the hydrocarbon filter reversibly. In this respect, the hydrocarbon filter can also be referred to as a hydrocarbon buffer.

Since the hydrocarbon filter only has a limited capacity to absorb fuel or hydrocarbons, it is necessary to flush it occasionally. This is done using a negative pressure present in the intake tract of the internal combustion engine. During flushing, the tank shut-off valve is closed and the purge valve is open. Accordingly, the air delivered by the pump flows through the hydrocarbon filter and absorbs the fuel or hydrocarbon temporarily stored in the hydrocarbon filter, so that downstream of the hydrocarbon filter the fluid is again present, which consists of air and fuel or hydrocarbon in any proportions. Downstream of the hydrocarbon filter, the fluid flows in the direction of the intake tract of the internal combustion engine due to the closed tank shut-off valve and the open purge valve and is burnt in the engine. Flushing of the hydrocarbon filter thus takes place during operation of the drive unit or the internal combustion engine.

In order to reliably prevent fuel, in particular gaseous fuel, from escaping into the external environment, it is necessary to carry out a leakage test at least temporarily, for example once or several times, in particular periodically. For the fuel tank designed as a pressure tank, this can be done simply by checking whether the overpressure builds up in the fuel tank over time when the tank shut-off valve is closed. If the overpressure, that is the pressure in the fuel tank relative to the pressure in the external environment, exceeds a certain threshold value, it can be concluded that the fuel tank is tight. However, if the overpressure does not exceed the pressure threshold, in particular within a certain period of time after a closure of the tank shut-off valve, then—purely optionally—a leakage of the fuel tank is detected. In other words, preferably only tightness is detected, not a leak. However, this can be done additionally. For example, it is assumed that the fuel tank is leaking if the described procedure does not conclude that it is tight.

In addition or alternatively to the fuel tank, further areas of the fuel tank arrangement are tested for tightness within the scope of the leakage test, in particular an area which lies fluidically between the tank shut-off valve, the shut-off valve and the purge valve. In this respect, the area includes in particular the hydrocarbon filter and/or the pump. To carry out the leakage test, the tank shut-off valve is opened, the purge valve is closed and air is conveyed towards the fuel tank by means of the pump. A current intensity of the electric current used to operate the pump is determined. If the amperage exceeds a certain amperage threshold, it can be concluded that the fuel tank arrangement is sufficiently tight, since the amperage is directly dependent on the pressure present in the fuel tank. If the current intensity does not reach the current intensity threshold value, the leakage of the fuel tank arrangement is detected.

However, the described procedure either only allows a leakage test of the fuel tank or—in the case of the comparison of the current intensity with the current intensity threshold value—is inaccurate. For this reason, it is now intended to first determine the pressure in the fuel tank and compare it with the pressure threshold value. The pressure in the fuel tank is determined when the tank shut-off valve is closed. If the pressure is greater than the pressure threshold value, the first leakage test mode is carried out.

In the first leakage test mode, the shut-off valve, which is fluidically located between the pump and the external environment, is closed first. Then the tank shut-off valve is opened. This results in pressure equalisation between the fuel tank and the area of the fuel tank arrangement fluidically between the tank shut-off valve, the purge valve and the shut-off valve. In particular, the excess pressure in the fuel tank is reduced in the direction of this area. However, since a volume of the fuel tank is significantly larger than a volume of the area away from the fuel tank, only a slight pressure reduction occurs in the fuel tank, whereas the pressure in the area away from the fuel tank increases significantly.

During the test period, the pressure in the fuel tank is measured using the pressure sensor. During the entire test period, the tank shut-off valve is kept open and the shut-off valve is kept closed. If the pressure in the fuel tank drops over the test period or the specified time period, the pressure difference of this pressure drop is determined. The pressure drop is understood to be a reduction in pressure during the test period or the specified time period, which comprises at least part of the test period.

The pressure difference in turn describes an extent of the pressure drop, for example, the pressure difference corresponds to a difference between a first pressure present at the beginning of the specific time period and a second pressure present subsequently, in particular at the end of the specific time period. If the pressure difference exceeds the difference threshold value, that is if the pressure difference is greater than the difference threshold value, it can be assumed that fluid is escaping or has escaped from the fuel tank arrangement in the direction of the external environment. In this case, the leakage of the fuel tank arrangement is detected accordingly.

The described procedure within the first leakage test mode allows leakage testing of the entire fuel tank assembly, especially the fuel tank and the area different from it, and not only the fuel tank. At the same time, a high accuracy of the leakage test is achieved as this is done using the pressure sensor and is not based on the amperage of the pump. Overall, therefore, a fast and reliable leakage test is realised, which makes use of the overpressure present in the fuel tank. The first leakage test mode is essentially based on the fact that the fuel tank is designed as a pressure tank.

According to a further embodiment of the invention, when the pressure in the fuel tank is less than or equal to the pressure threshold, a second leakage test mode is carried out in which the tank shut-off valve is opened and air is pumped from the external environment towards the fuel tank by means of the pump until a pressure measured by means of the pressure sensor reaches a target pressure, and after the target pressure is reached by the pressure, the shut-off valve is closed, wherein after the closure of the shut-off valve during the test period, the pressure in the fuel tank is measured by means of the pressure sensor and, if the difference threshold value is exceeded, the leakage of the fuel tank arrangement is detected by the difference of the pressure over the determined period of time.

The second leakage test mode is performed if the pressure in the fuel tank is not sufficient to perform the first leakage test mode. In this case, the second leakage test mode is carried out instead of the first leakage test mode. In this mode, too, the tank shut-off valve is opened and the purge valve is closed. Then—with the shut-off valve open—air is pumped from the external environment towards the fuel tank with the aid of the pump, so that the pressure prevailing in the fuel tank arrangement increases. When the pressure measured in the fuel tank has reached the target pressure, the shut-off valve is closed. The tank shut-off valve remains open and the purge valve remains closed. The test period then follows, during which the procedure is the same as described above. The explained procedure enables the leakage test of the fuel tank arrangement even if the pressure present in the fuel tank is too low for the first leakage test mode.

A further embodiment of the invention provides that, in the first leakage test mode, the pressure in the fuel tank is measured during a monitoring period after the tank shut-off valve has been opened and, in the absence of a pressure reduction, a fault in the fuel tank arrangement is concluded.

The monitoring period is before the test period. Preferably, the monitoring period immediately follows the opening of the tank shut-off valve. Thus, the pressure in the fuel tank is reduced during the monitoring period. If this pressure reduction does not occur, the fault of the fuel tank arrangement is concluded.

The fault of the fuel tank arrangement can, for example, be understood as a fault of the tank shut-off valve or a fault of the pressure sensor. If a diagnosis of the pressure sensor has already been carried out, and if this diagnosis has shown that the pressure sensor is operational, then the fault of the tank shut-off valve is concluded immediately. Otherwise, a suspected fault is triggered, which includes a possible fault in the tank shut-off valve and a possible fault in the pressure sensor. Subsequently, a diagnosis of the pressure sensor is carried out. If the fault is suspected and the diagnosis shows that the pressure sensor is operational, the fault of the tank shut-off valve is concluded. If, on the other hand, a fault is detected in the pressure sensor during the diagnosis and the fault is suspected, the fault in the pressure sensor is concluded. All in all, this realises an extremely accurate diagnosis and leakage test.

A further embodiment of the invention provides that during the monitoring period a gradient of the pressure over time is determined and compared with a gradient threshold value, wherein the pressure is determined when the gradient falls below the gradient threshold value and a switch from the first leakage test mode to the second leakage test mode is carried out when the pressure falls below a minimum pressure. During the monitoring period, the gradient of the pressure over time is determined in addition or as an alternative to checking for the absence of pressure reduction. The pressure gradient is determined from the measured pressure. The gradient is determined permanently or periodically, in particular until the gradient falls below the gradient threshold value, that is it is smaller than this.

When the gradient falls below the gradient threshold value, the current pressure is determined. In other words, the current pressure is determined as soon as the gradient falls below the gradient threshold value. The pressure is compared with the minimum pressure. If the pressure falls below the minimum pressure, that is if the pressure is lower than the minimum pressure, it is concluded that the pressure present in the fuel tank before the tank shut-off valve was opened was not sufficiently high to carry out the first leakage test mode. For this reason, the second leakage test mode is switched to in this case.

Switching to the second leakage test mode means that the shut-off valve is opened and the pump is operated to pump air from the external environment towards the fuel tank until the pressure measured in the fuel tank reaches the target pressure. When or immediately after the pressure reaches the target pressure, the shut-off valve is closed. The test period then begins, during which the procedure is as described above.

A further embodiment of the invention provides that the test period is initiated if the pressure is greater than or equal to the minimum pressure. If the pressure present when the gradient falls below the gradient threshold value is at least equal to the minimum pressure, the test period is initiated, preferably immediately, so that the test period directly follows the monitoring period. This ensures that the pressure present in the fuel tank arrangement is still sufficient to carry out the leakage test.

A further embodiment of the invention provides for the leakage to be classified on the basis of the pressure difference of the pressure drop over the determined period of time. For example, several leakage classes are defined, each of which is assigned a threshold value for the pressure difference. After determining the pressure difference, that leakage class is selected from the leakage classes which has the largest threshold value which is at least reached or exceeded by the pressure difference. Preferably, each of the leakage classes is assigned an equivalent diameter of a leak. For example, a first of the leakage classes is present for an equivalent diameter of a leak of 0.5 mm and a second of the leakage classes is present for an equivalent diameter of the leak of 1.0 mm. With the help of the leakage classes, a sufficiently precise statement about the extent of the leakage is possible. Preferably, a fault entry is made in a fault memory of the motor vehicle depending on the selected leakage class.

In a further embodiment of the invention, in the first leakage test mode and the second leakage test mode, the purge valve between the hydrocarbon filter and the intake manifold is closed. This prevents fluid from escaping from the fuel tank arrangement in the direction of the intake tract and thereby impairing the leakage test.

A further embodiment of the invention provides that a check valve of a pump arrangement comprising the pump is used as a shut-off valve. The pump arrangement thus has both the pump and the shut-off valve. The shut-off valve is designed as a check valve which only allows flow from the external environment into the fuel tank arrangement, but not vice versa. The method can therefore be implemented with little effort. The check valve can, of course, be a purely mechanical check valve or an electrically controlled check valve which can be opened and closed in a targeted manner by control.

A further embodiment of the invention provides that after the test period, the tank shut-off valve is closed and the shut-off valve is opened so that fluid comprising air and gaseous fuel flows between the tank shut-off valve and the hydrocarbon filter through the hydrocarbon filter towards the external environment. After the leakage test has been completed, the fuel tank is fluidically separated from the other area of the fuel tank arrangement by closing the tank shut-off valve. The shut-off valve is opened to relieve the excess pressure in this other area. Accordingly, the fluid present there flows in the direction of the external environment, namely through the hydrocarbon filter, so that fuel contained in the fluid is separated and temporarily stored in it. The tank shut-off valve is closed before the shut-off valve is opened. In particular, the shut-off valve is not opened until the tank shut-off valve is fully closed. This prevents a large amount of fluid from the fuel tank from flowing through the hydrocarbon filter and thus a large amount of fuel from accumulating in it.

The invention further relates to a fuel tank arrangement for a motor vehicle, in particular for carrying out the method according to the explanations within the scope of this description, having a fuel tank, a hydrocarbon filter and a pump, wherein the fuel tank is fluidically connected to the hydrocarbon filter via a tank shut-off valve and the hydrocarbon filter is fluidically connected, on the one hand, to an external environment of the fuel tank arrangement via the pump and, on the other hand, to an intake tract of an internal combustion engine via a purge valve.

In this case, the fuel tank arrangement is provided and designed for carrying out a first leakage test mode when a pressure present in the fuel tank is greater than a pressure threshold value, in which a shut-off valve arranged in terms of flow between the pump and the external environment is closed and the tank shut-off valve is opened and then, during a test period, the pressure in the fuel tank is measured by means of a pressure sensor arranged in the fuel tank and, if a differential threshold value is exceeded, a leakage of the fuel tank arrangement is detected by a pressure difference of a pressure drop of the pressure over a certain period of time.

The advantages of such a design of the fuel tank arrangement and such a method have already been pointed out. Both the fuel tank arrangement and the method for operating it can be further developed according to the explanations within the scope of this description, so that reference is made to this in this respect.

The features and combinations of features described in the description, in particular the features and combinations of features described in the following figure description and/or shown in the figures, can be used not only in the respective combination indicated, but also in other combinations or on their own, without leaving the scope of the invention. Thus, embodiments which are not explicitly shown or explained in the description and/or the figures, but which result from the explained embodiments or can be derived from them, are also to be regarded as within the scope of the invention.

BRIEF DESCRIPTION OF THE FIGURES

The invention is explained in more detail below with reference to the embodiments shown in the drawing, without any limitation of the invention. Thereby shows.

DETAILED DESCRIPTION

Figure 1:
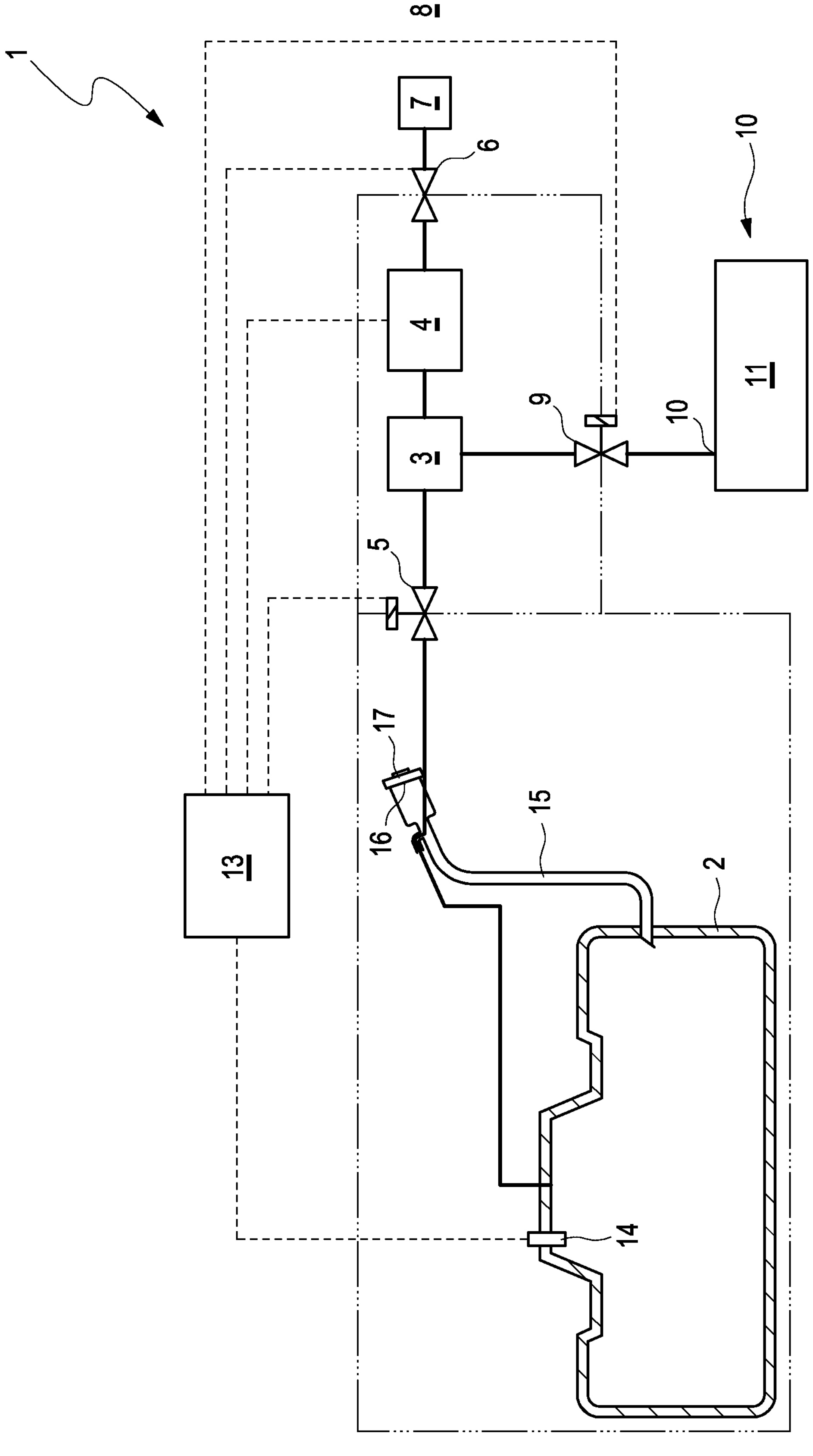
FIG. 1 a schematic representation of a fuel tank arrangement for a motor vehicle, and FIG. 2 a flow diagram of a method for operating the fuel tank arrangement.

FIG. 1 shows a schematic representation of a fuel tank arrangement 1, which is preferably a component of a motor vehicle not further shown here. The fuel tank arrangement 1 has a fuel tank 2, a hydrocarbon filter 3 and a pump 4. The fuel tank 2 is fluidically connected to the hydrocarbon filter 3 via a tank shut-off valve 5. The hydrocarbon filter 3 is also fluidically connected to an external environment 8 of the fuel tank arrangement 1 via the pump 4, a shut-off valve 6 and an air filter 7 on the one hand and to an intake tract 10 of an internal combustion engine 11 via a purge valve 9 on the other hand. The internal combustion engine 11 forms a component of a drive device 12 of the motor vehicle.

The tank shut-off valve 5, the shut-off valve 6 and the purge valve 9 or a respective control device are electrically connected to a control unit 13. Furthermore, a pressure sensor 14 is connected to the control unit 13, which is arranged in the fuel tank 2 and thus serves to measure the pressure in the fuel tank 2. A fuel filler pipe 15 is connected to the fuel tank 2. On its side facing away from the fuel tank 2, the fuel filler pipe 15 has a tank opening 16 which is closed by means of a tank cap 17.

Figure 2:
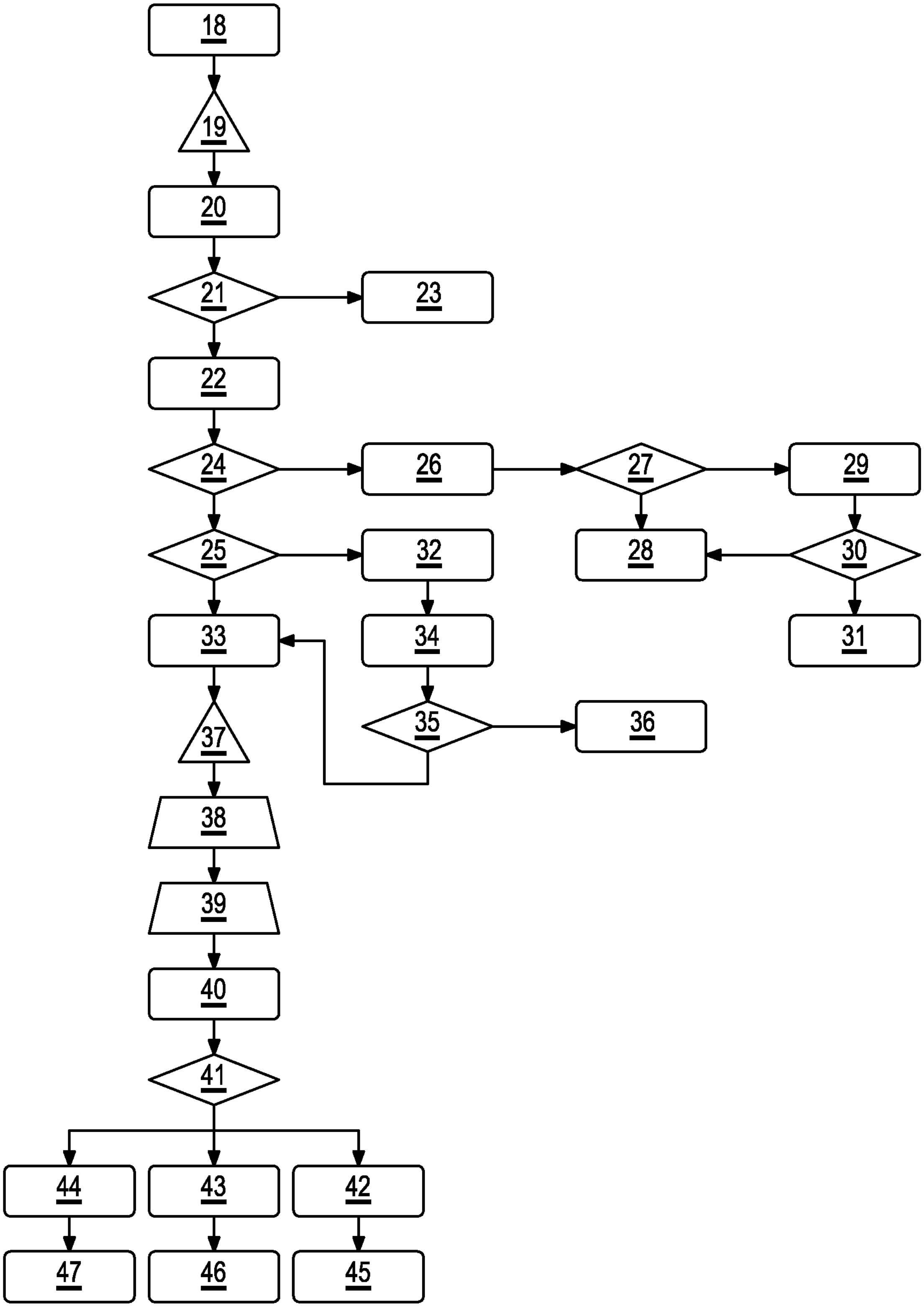

FIG. 2 shows a flow chart of a method for operating the fuel tank arrangement 1. The method starts at a starting point 18. After the starting point 18, a delay step 19 follows, which waits for a fixed period of time. Subsequently, in a step 20, it is decided whether only the fuel tank 2 or the entire fuel tank arrangement 1 is to be subjected to a leakage test. If the former is the case, a query 21 asks whether the pressure in the fuel tank 2 is greater than a pressure threshold value. If this is the case, the system branches to a step 22 at which a first leakage test mode is started. Otherwise, it branches to a step 23 at which a second leakage test mode is started.

In the first leakage test mode, the shut-off valve 6 is closed and the tank shut-off valve 5 is opened. If it is determined during a subsequent query 24 that the pressure in the fuel tank 2 is decreasing, the system branches to an query 25, otherwise it branches to a step 26. In step 26, a check for a defect in the tank shut-off valve 5 and the pressure sensor 14 is initiated.

First, a query 27 checks whether the pressure sensor 14 has already been diagnosed and whether this resulted in a functioning pressure sensor 14. If this is the case, that is if it is ensured that the pressure sensor 14 is functioning properly, a fault in the tank shut-off valve 5 is detected in a step 28. Otherwise, the system branches to step 29, in which a suspected fault in the tank shut-off valve 5 and a fault in the pressure sensor 14 are recorded.

A diagnosis of the pressure sensor 14 is then carried out. Once this has been done, the result of this diagnosis is checked in an query 30. If the pressure sensor 14 is functional according to the diagnosis, the fault of the tank shut-off valve 5 is detected in step 28. Otherwise, a fault in the pressure sensor 14 is detected in step 31.

Within the scope of query 25, a gradient of the pressure over time is determined during a monitoring period and compared with a gradient threshold value. If the pressure gradient falls below a gradient threshold value, the pressure is determined when this falls below. If the pressure is lower than a minimum pressure, the system branches to step 32, otherwise to step 33. In step 32, a suspicion of a defect in the shut-off valve 6 or a rough leakage is recorded.

The system then switches to the second leakage test mode. In this mode, air is first delivered from of the external environment 8 towards the fuel tank 2 by means of the pump 4 in a step 34. The shut-off valve 6 is opened beforehand. During delivery, the pressure in the fuel tank 2 is measured by the pressure sensor 14. If the pressure reaches a target pressure after a certain period of time, which is checked in query 35, the shut-off valve 6 is closed and branched to step 33. Otherwise, a fault in the shut-off valve 6 or a rough leakage of the fuel tank arrangement 1 is detected in step 36.

In step 33, a test period is initiated. First, a delay step 37 is carried out. Then the pressure present in the fuel tank 2 is measured and recorded. If a pressure drop occurs, the pressure difference of the pressure drop is determined in a step 38. The test period is then ended in a step 39 and the pressure or the pressure difference is evaluated in a subsequent step 40.

In a subsequent query 41, it is determined how large the pressure difference is. If the pressure difference is smaller than a first difference threshold, the system branches to a step 42. If the pressure difference is at least as large as the first difference threshold, the system branches to a step 43. If, on the other hand, the pressure difference is at least as great as a second differential threshold value that is greater than the first differential threshold value, the branching takes place to a step 44.

Step 42 is followed by step 45, according to which it is detected that there is no leakage of the fuel tank assembly 1. A step 43 is followed by a step 46 according to which a leakage of the fuel tank arrangement 1 with a first leakage class is detected. Step 44 is in turn followed by a step 47 according to which the leakage of the fuel tank arrangement 1 with a second leakage class is detected. After each of steps 45, 46 and 47, the described method is terminated.

The explained procedure enables an extremely reliable leakage test of the fuel tank arrangement 1. In this case, the overpressure present in the fuel tank 2 is preferably used anyway, so that the pump 4 is not operated in the first leakage test mode. On the other hand, pump 4 is only used in the second leakage test mode.

REFERENCE LIST

1 Fuel tank arrangement
2 Fuel tank
3 Hydrocarbon filter
4 Pump
5 Tank shut-off valve
6 Shut-off valve
7 Air filter
8 External environment
9 Purge valve
10 Intake tract
11 Internal combustion engine
12 Drive device
13 Control unit
14 Pressure sensor
15 Fuel filler pipe
16 Tank opening
17 Tank cap
18 Start point
19 Delay step
20 Step
21 Query
22 Step
23 Step
24 Query
25 Query
26 Step
27 Query
28 Step
29 Step
30 Query
31 Step
32 Step
33 Step
34 Step
35 Query
36 Step
37 Delay step
38 Step
39 Step
40 Step
41 Query
42 Step
43 Step
44 Step
45 Step
46 Step
47 Step

The invention claimed is:

1. A method for operating a fuel tank arrangement for a motor vehicle, the fuel tank arrangement having a fuel tank, a hydrocarbon filter and a pump, wherein the fuel tank is fluidically connected via a tank shut-off valve to the hydrocarbon filter and the hydrocarbon filter is fluidically connected, on the one hand, via the pump to an external environment of the fuel tank arrangement and, on the other hand, via a purge valve to an intake tract of an internal combustion engine, wherein there is a series connection between the hydrocarbon filter, the pump, and an opening to the external environment configured to permit fluid flow from the hydrocarbon filter, through the pump, and out the opening to the external environment, wherein the method comprises carrying out a first leakage test mode when the pressure present in the fuel tank is greater than a pressure threshold value, comprising closing a shut-off valve arranged in terms of flow between the pump and the external environment and opening the tank shut-off valve and then, during a test period, measuring the pressure in the fuel tank by a pressure sensor arranged in the fuel tank and, if a differential threshold value is exceeded, detecting a leakage of the fuel tank arrangement by a pressure difference of a pressure drop of the pressure over a specific period of time.

2. The method according to claim 1, further comprising, when the pressure in the fuel tank is less than or equal to the pressure threshold value, carrying out a second leakage test mode, in which the tank shut-off valve is opened and air is pumped by the pump from the external environment towards the fuel tank until a pressure measured by the pressure sensor reaches a target pressure and, after the target pressure has been reached by the pressure, closing the shut-off valve, further comprising measuring the pressure in the fuel tank by the pressure sensor after the shut-off valve has closed during the test period and detecting the leakage of the fuel tank arrangement when the differential threshold value is exceeded by the difference in pressure over the specific period of time.

3. The method according to claim 1, further comprising, in the first leakage test mode, after the tank shut-off valve has been opened during a monitoring period, measuring the pressure in the fuel tank and, in the absence of a pressure reduction, identifying a fault in the fuel tank arrangement.

4. The method according to claim 1, further comprising, during the monitoring period, determining a gradient of the pressure over time and comparing the gradient with a gradient threshold value, determining the pressure when the gradient falls below the gradient threshold value and carrying out a switch from the first leakage test mode to a second leakage test mode when the pressure falls below a minimum pressure.

5. The method according to claim 1, further comprising initiating the test period if the pressure is greater than or equal to the minimum pressure.

6. The method according to claim 1, further comprising making a classification of the leakage on the basis of the pressure difference of the pressure drop over the determined period of time.

7. The method according to claim 1, wherein in the first leakage test mode and the second leakage test mode the purge valve present between the hydrocarbon filter and the intake tract is closed.

8. The method according to claim 1, wherein a check valve of a pump arrangement comprising the pump is used as the shut-off valve.

9. The method according to claim 1, further comprising, after the test period, closing the tank shut-off valve, and opening the shut-off valve so that fluid comprising air and gaseous fuel present between the tank shut-off valve and the hydrocarbon filter flows through the hydrocarbon filter towards the external environment.

10. A fuel tank arrangement for a motor vehicle, comprising: a fuel tank, a hydrocarbon filter and a pump, the fuel tank being fluidically connected to the hydrocarbon filter via a tank shut-off valve and the hydrocarbon filter being fluidically connected, on the one hand, to an external environment of the fuel tank arrangement via the pump and, on the other hand, to an intake tract of an internal combustion engine via a shut-off valve, wherein there is a series connection between the hydrocarbon filter, the pump, and an opening to the external environment configured to permit fluid flow from the hydrocarbon filter, through the pump, and out the opening to the external environment, wherein the fuel tank arrangement is provided and designed to carry out a first leakage test mode when a pressure present in the fuel tank is greater than a pressure threshold value, in which a shut-off valve arranged in terms of flow between the pump and the external environment is closed and the tank shut-off valve is opened and then, during a test period, the pressure in the fuel tank is measured by a pressure sensor arranged in the fuel tank and, if a differential threshold value is exceeded, a leakage of the fuel tank arrangement is detected by a pressure difference of a pressure drop of the pressure over a specific period of time.

11. The method according to claim 2, further comprising, in the first leakage test mode, after the tank shut-off valve has been opened during a monitoring period, measuring the pressure in the fuel tank and, in the absence of a pressure reduction, identifying a fault in the fuel tank arrangement.

12. The method according to claim 2, further comprising, during the monitoring period, determining a gradient of the pressure over time and comparing the gradient with a gradient threshold value, determining the pressure when the gradient falls below the gradient threshold value and carrying out a switch from the first leakage test mode to the second leakage test mode when the pressure falls below a minimum pressure.

13. The method according to claim 3, further comprising, during the monitoring period, determining a gradient of the pressure over time and comparing the gradient with a gradient threshold value, determining the pressure when the gradient falls below the gradient threshold value and carrying out a switch from the first leakage test mode to the second leakage test mode when the pressure falls below a minimum pressure.

14. The method according to claim 2, further comprising initiating the test period if the pressure is greater than or equal to the minimum pressure.

15. The method according to claim 3, further comprising initiating the test period if the pressure is greater than or equal to the minimum pressure.

16. The method according to claim 4, further comprising initiating the test period if the pressure is greater than or equal to the minimum pressure.

17. The method according to claim 2, further comprising making a classification of the leakage on the basis of the pressure difference of the pressure drop over the determined period of time.

18. The method according to claim 3, further comprising making a classification of the leakage on the basis of the pressure difference of the pressure drop over the determined period of time.

19. The method according to claim 4, further comprising making a classification of the leakage on the basis of the pressure difference of the pressure drop over the determined period of time.

20. The method according to claim 5, further comprising making a classification of the leakage on the basis of the pressure difference of the pressure drop over the determined period of time.

* * * * *